United States Patent
Mahalal

(10) Patent No.: US 7,376,845 B2
(45) Date of Patent: May 20, 2008

(54) METHOD FOR CALCULATING HASHING OF A MESSAGE IN A DEVICE COMMUNICATING WITH A SMART CARD

(75) Inventor: Ilan Mahalal, Paris (FR)

(73) Assignee: Axalto S.A., Meudon (FR)

( * ) Notice: Subject to any disclaimer, the term of this patent is extended or adjusted under 35 U.S.C. 154(b) by 197 days.

(21) Appl. No.: 10/526,206

(22) PCT Filed: Aug. 28, 2003

(86) PCT No.: PCT/IB03/03577

§ 371 (c)(1),
(2), (4) Date: Mar. 4, 2005

(87) PCT Pub. No.: WO2004/023832

PCT Pub. Date: Mar. 18, 2004

(65) Prior Publication Data

US 2006/0041568 A1    Feb. 23, 2006

(30) Foreign Application Priority Data

Sep. 4, 2002  (EP) ................................. 02292180

(51) Int. Cl.
  *H04L 9/00*    (2006.01)
  *H04L 9/32*    (2006.01)
  *G06F 11/30*   (2006.01)
  *G06F 12/14*   (2006.01)
  *G06F 7/04*    (2006.01)
  *G06F 17/30*   (2006.01)
  *G06K 9/00*    (2006.01)
  *G06K 19/00*   (2006.01)
  *G06F 7/58*    (2006.01)
  *G06F 15/16*   (2006.01)
  *G11C 7/00*    (2006.01)

(52) U.S. Cl. ...................... 713/194; 713/159; 713/160; 713/170; 726/2; 726/5; 726/9; 726/20

(58) Field of Classification Search ................ 713/194, 713/159, 160, 170; 726/2, 5, 9, 20
See application file for complete search history.

(56) References Cited

U.S. PATENT DOCUMENTS

2002/0056044 A1 *  5/2002  Andersson .................. 713/189

(Continued)

FOREIGN PATENT DOCUMENTS

FR        2 817 107 A1    5/2002

(Continued)

OTHER PUBLICATIONS

"Wireless Transport Layer Security"; WAP Forum, "Online!", XP-002223489, Wireless Application Protocol (WAP-261-WTLS-20010406-a), dated Apr. 6, 2001, pp. 1-106.

*Primary Examiner*—Ayaz Sheikh
*Assistant Examiner*—Shin-Hon Chen
(74) *Attorney, Agent, or Firm*—Osha Liang LLP

(57) ABSTRACT

A method for calculating hashing of a message in a device communicating with a smart card involves storing a same hash function in said device and said smart card, wherein the message includes-data blocks including secret data and other public data, and wherein secret data is only known by the smart card, performing a calculation of the hash function of the secret data in the smart card, and performing the calculation of the hash function of all or part of other public data in the device.

3 Claims, 2 Drawing Sheets

U.S. PATENT DOCUMENTS

2005/0069137 A1* 3/2005 Landrock .................... 380/278

FOREIGN PATENT DOCUMENTS

| WO | WO 01/43472 A1 | 6/2001 |
| WO | WO 01/84761 A1 | 11/2001 |
| WO | WO 02/054663 A2 | 7/2002 |

* cited by examiner

METHOD FOR CALCULATING HASHING OF A MESSAGE IN A DEVICE COMMUNICATING WITH A SMART CARD

FIELD OF THE INVENTION

The invention concerns a method for calculating hashing of a message in a smart card. In the following text, a smart card will designate all tamper-resistant devices able to store secret data.

The example that will be used for illustrating the invention is that of a WIM (WAP Identity Module) module coupled to a mobile phone. This smart card could also be a SIM (Subscriber Identity Module) smart card, or all other module able to store secret data and to perform Hash functions.

BACKGROUND

The Wireless Application Protocol (WAP) defines an industry-wide specification for developing applications that operate over wireless communication networks. The scope for the WAP Forum is to define a set of specifications to be used by service applications. The wireless market is growing very quickly, and reaching new customers and services. To enable operators and manufacturers to meet the challenges in advanced services, differentiation and fast/flexible service creation WAP Forum defines a set of protocols in transport, security, transaction, session and application layers.

The Security layer protocols in the WAP architecture can be the Wireless Transport Layer Security (WTLS) or the standard Transport Layer Security (TLS) Internet protocol. WTLS provides functionality similar to TLS but is more adapted to lower bandwidth communication channels. TLS and WTLS layer operate above the transport protocol layer. They provide the upper-level layer of WAP with a secure transport service interface and also provide an interface for managing (eg, creating and terminating) secure connections. The primary goal of the WTLS or TLS layers is to provide privacy, data integrity and authentication between two communicating applications.

For optimum security, some parts of the security functionality need to be performed by a tamper-resistant device, so that an attacker cannot retrieve sensitive data. Such data is especially the permanent private keys used in the WTLS or TLS handshakes with client authentication, and for making application level electronic signatures (such as confirming an application level transaction).

In particular, when a message has to be hashed in a mobile coupled to a WIM module, all the blocks are transferred from the mobile to the WIM for being hashed. Then, the WIM sends the result to the mobile. An example of a WIM implementation is the smart card CAR. In the phone, it can be the Subscriber Identity Module SIM card or an external smart card. The problem is that, in the WIM, resources are very limited; consequently, calculations take a lot of time.

For example, in WTLS and TLS, the Mobile Equipment sends to the server a message called "Finished" message, which is always sent to the server at the end of a handshake to verify that the key exchange and authentication processes were successful between the mobile and the server. The Mobile Equipment uses the smart card for calculating the data to send in the "Finished" message and also the data that should be received from the server. In order to do that, the mobile ME issues the "Client Finished Check" and "Server Finished Check" commands to the smart card CAR. Using a Pseudo Random Function (PRF), the smart card calculates a requested number of bytes based on the session master secret, and a seed value received from the mobile. The card then returns the bytes to be used by the mobile in the "Finished" message. For calculating the Client Finished Check data, the mobile uses a primitive called WIM-PHash primitive with the following input data parameter:

"client finished"+Hash(handshake_messages)

The "Hash(handshake_messages)" is defined as the SHA-1 and/or MD5 hash (depending on protocol) of the concatenation of all previous handshake messages that were exchanged up to but not including the "Finished" message. The primitive then returns to the mobile the needed data block.

We will refer the standard for more details about the commands and primitives which are cited above.

In the same manner, for Calculating the server finished check, the mobile ME uses the WIM-PHash primitive with the following input data parameter:

"server finished"+Hash(handshake_messages).

The primitive then returns to the mobile the needed data block.

In SSL, the parameters that are sent to the WIM for the "Finished" message are different. When we perform the finished check in SSL, it is necessary to perform a hash on:

'handshake_messages+Sender+master_secret+pad1'.

Comparing with WTLS and TLS, we see that the Hash should be calculated also over the session "master secret" in addition to "handshake_messages". This poses a problem since the mobile ME does not know the value of the master secret as it is securely stored in the smart card CAR and is never exposed externally. Consequently, the following data: 'handshake_messages+Sender+master_secret+pad1' has to be sent to the WIM for being hashed. Nevertheless, resources are very limited in the WIM, consequently calculations in the smart card take a lot of time.

SUMMARY OF INVENTION

The aim of the invention is to hash a message in an efficient manner reducing the consumption of resources in the WIM.

The invention is a method for calculating hashing of a message in a device communicating with a smart card, said device and said smart card storing the same hash function, the message comprising data blocks including secret data and other data, secret data being only known by the smart card. According to the invention, the calculation of the hash of the secret data is performed in the smart card and the calculation of the hash of all or part of the other data is performed in the device.

We will that, the intermediate result is transmitted from the device to the card, or inversely, depending on whether the hash calculation of the hash of a data has to be performed by the smart card or the device.

In this way, the invention avoids time consuming to calculate a Hash function in the smart card since the device, in particular a mobile phone, can usually do it faster as it has a stronger processor.

It will be easier to understand the invention on reading the description below, given as an example and referring to the attached drawings.

DETAILED DESCRIPTION OF EXAMPLES ILLUSTRATING THE INVENTION

Figure 1:
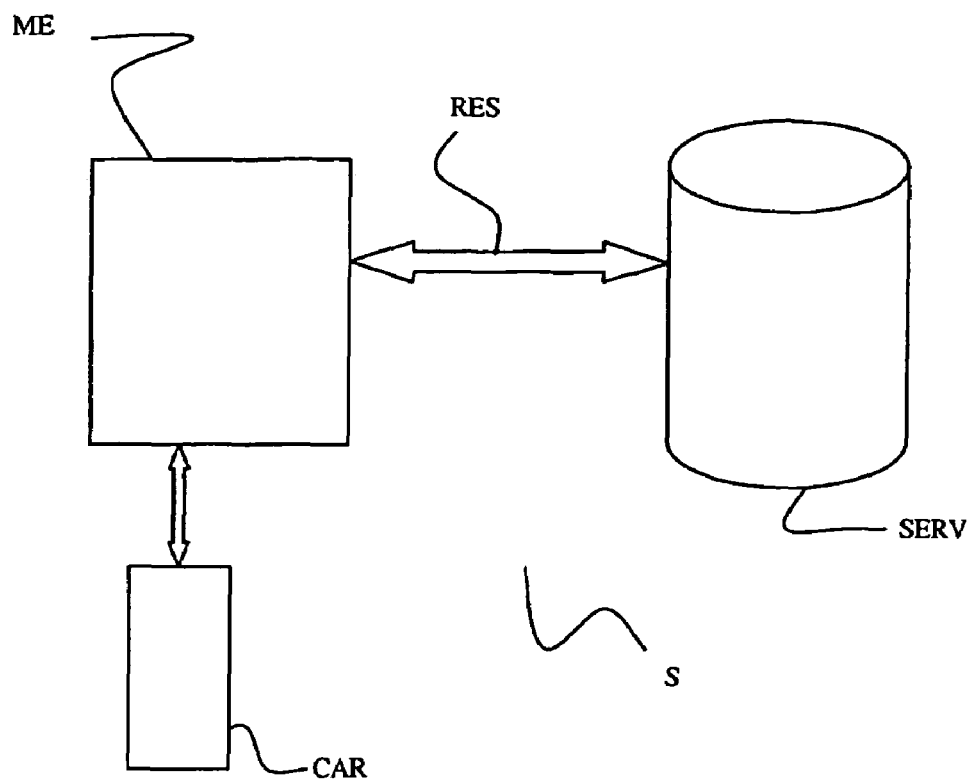
FIG. 1 represents an example of a data processing system S in which the invention may be applied.
Figure 2:
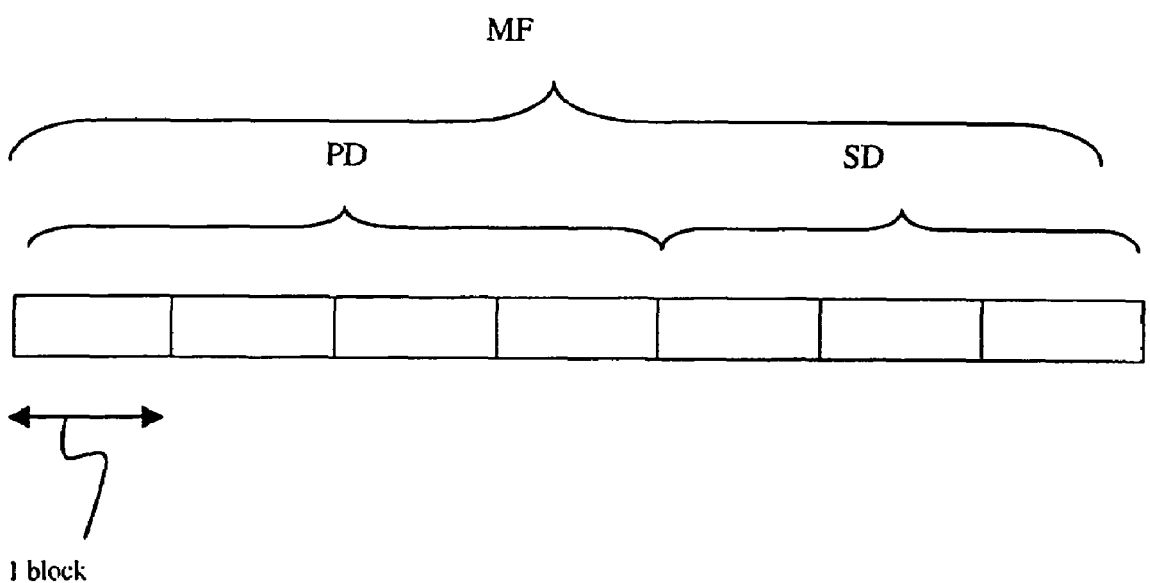
FIGS. 2-4 are views of different types of messages including secret data.

In order to simplify the description, the same elements illustrated in the drawings have the same references.

FIG. 1 represents a system S. In our example, this system includes a smart card CAR coupled to a mobile phone ME communicating with a server SERV through a network RES.

Generally, the smart card is used to store and process information needed for user identification and authentication. The smart card CAR stores the client sensitive data, especially keys and sessions master secrets.

The smart card cn be a WIM module. The WIM (WAP Identity Module) is a security token standardized in the WAP Forum. We will refer to this standard for more details on the module WIM. As mentioned above, the WAP Forum WIM specification describes how the WIM is used with TLS and WTLS and in application level services.

Generally, as mentioned above, when a message includes keys and master secrets and that this one has to be hashed in a mobile coupled to a WIM module, all the blocks are transferred from the mobile to the WIM for performing a Hash step. Then, the WIM sends the result to the mobile. All operations where keys and master secrets are involved are performed internally in the module WIM.

Generally, a Hash function works on a fixed length of data input and the result is carried on to the next iteration. It calculates a hash on the first block of the data (64 bytes for SHA-1), then carry the result to the calculation of the Hash on the second block and continue like that until all input data is consumed.

In our example we want to hash a data input, called message MF in the following description, including:

"PD+SD"

where the "+" operator means concatenation.

This data message MF comprises data blocks including secret data SD, which could be the "master secret" data and other data PD, which could be the "handshake_messages"

According to the invention, the mobile ME can start calculating the hash over the other data PD which are public. The result of this calculation constitutes an intermediate result R. Then, the mobile ME sends the intermediate result R to the smart card CAR. The smart card continues the hash calculation internally by using the intermediate result R, the remaining secret data SD and the additional data (e.g. "master_secret") that is kept internally in the smart card CAR. Once the calculation is finished, the smart card sends the corresponding result to the mobile ME.

Figure 3:
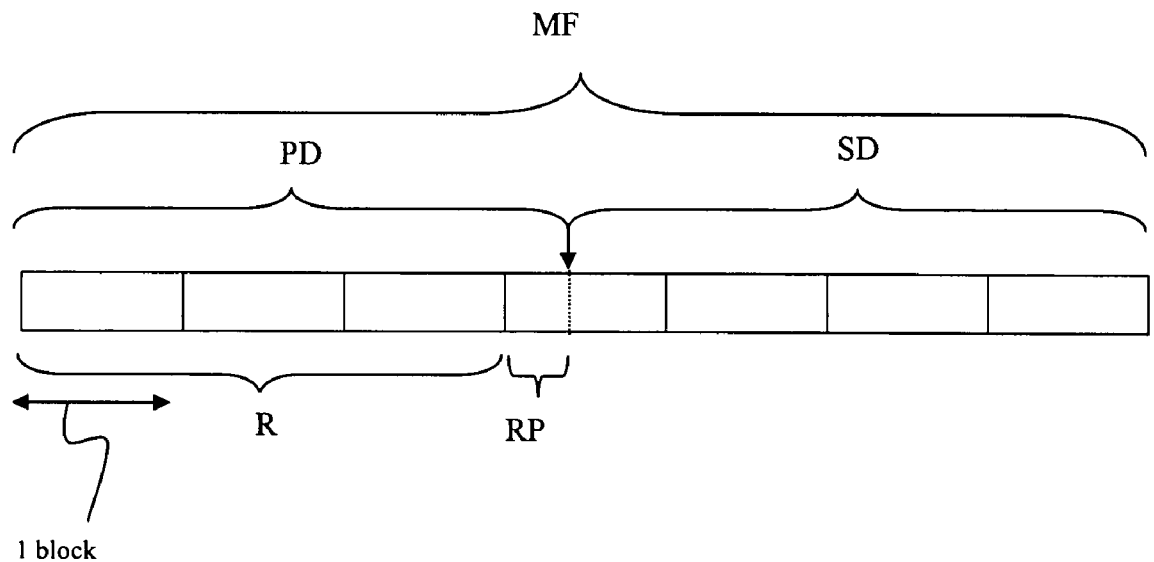
Figure 4:
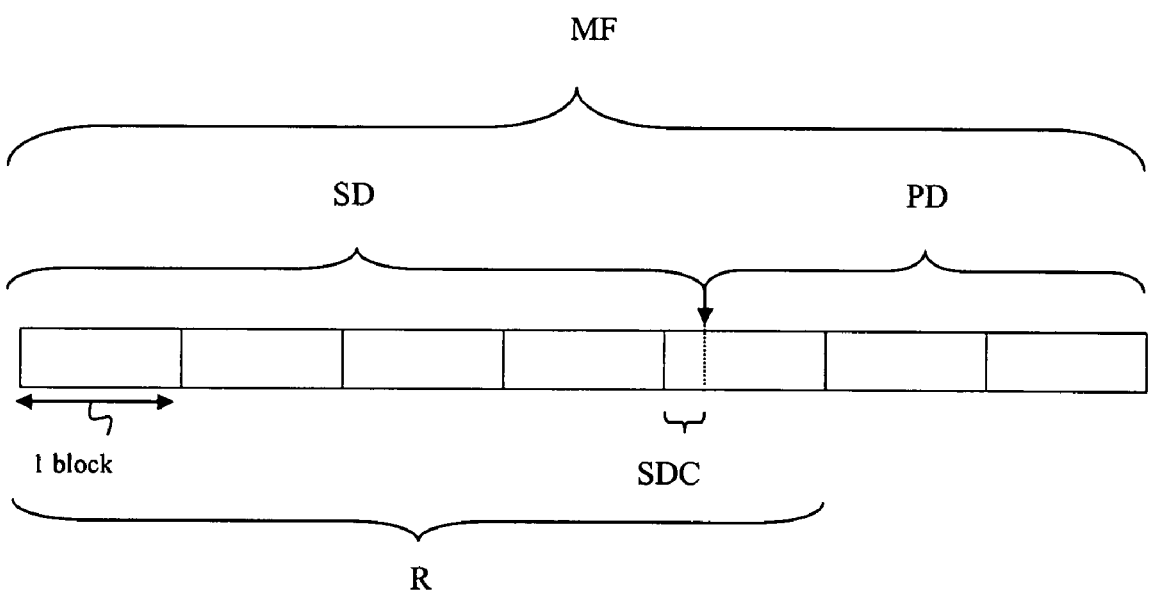

So, Generally, according to the invention, if a secret data SD is followed by the other data PD in the message MF (see FIG. 4), the smart card starts calculating the hash of all blocks that include a secret data SD and then sends the corresponding intermediate result R to the ME that continues the hash calculation by using the intermediate result R and the remaining data PD. For example, the data SDC including secret data is hashed in the smartcard. On the contrary, if data PD is followed by the other data SD (see FIG. 3), the mobile ME starts calculating the hash of the data PD and then send the corresponding intermediate result R and remaining part RP of last hash block to the smart card that continues to do the hash calculation internally by using the intermediate result R, last hash block and the remaining data SD.

Advantageously, if a block includes a part comprising secret data SD and another part comprising other data PD, the smart card calculates the hash of this block. In this way, the transfer of data is decreased between the mobile ME and the smart card CAR.

This invention also formalizes the way by which the intermediate results R are sent to the smart card in order to use the same convention of command exchanged between the mobile ME and the smart card CAR for other primitives. In our example, the mobile ME will send the hashed intermediate result R and other data if needed with the "WIM MSE-Set" command. These parameters will be put in a newly defined "SSL security environment" in the smart card CAR. In our example, The SSL security environment will implement acceptance of these parameters via the "MSE-set" command, which should be called before invoking the "PSO" command for calculating the "Finished" message.

In our example, the device is implementing the Transport Layer Security protocol SSL (Secure Socket Layer) and the smart card is a WAP Identity Module (WIM). More specifically, the message MF is called "Finished" in the SSL protocol. The secret data SD is an SSL session master secret.

The invention also concerns a communication device ME characterized in that it includes a program for performing the following steps:
  a hashing step in which all or part of said other data PD are hashed in said communication device,
  a requesting step in which, said communication system request the smart card to perform the hash of all the secret data SD.

The invention also concerns a smart card CAR characterized in that said smart card includes a program for performing, when requested by the communication device ME, a step of hashing said secret data SD.

The main advantage of the above solution is speed. It will take more time to write the whole data in a file in the WIM and then have the WIM read it and hash it. Speed is very important in the handshake and it is very important to optimise it. If it takes more than a few seconds to establish a secure session it is not very convenient for the user. The other advantage is to avoid the need to store a big block of data in the WIM for a specific primitive. This invention defines a solution for calculating the "Finished" message by the WIM module for SSL in an efficient manner and without the need to send the whole "handshake_messages" data block to store in the WIM. For example, In WTLS, protecting secure sessions are relatively long living—which could be several days. The invention will avoid frequent full handshakes which are relatively heavy both computationally and due to large data transfer.

Of course, the invention is not limited to SSL but can be used in other technical fields.

What is claimed is:

1. A method for calculating hashing of a message in a device communicating with a smart card, comprising:
  determining the message to hash, wherein the message is divided in data blocks, wherein message comprises a key and public data ordered in a sequence, and wherein the key is only known by the smart card;
  hashing, using a hash function, the key in the smart card to obtain a hashed key;

hashing, using a hash function, at least a portion of the public data in the device to obtain hashed public data,
wherein the hashed key and the hashed public data are used to obtain a hash of the message,
wherein hashing the key comprises applying the hash function to the key when the key proceeds, based on the sequence, the public data in the message;
wherein hashing the key comprises applying the hash function to the key and the hashed public data when the key follows, based on the sequence, the public data in the message;
wherein hashing the public data comprises applying the hash function to the public data when the public data proceeds, based on the sequence, the key in the message;
wherein hashing the public data comprises applying the hash function to the public data and the hashed key when the public data follows, based on the sequence, the key in the message.

2. An apparatus comprising:
a communication device configured to be coupled to a smart card, said communication device and said smart card storing a same hash function for calculating a hash of a message, said message being divided in data blocks and comprising a key and public data, wherein the key is only known by the smart card,
wherein said communication device includes a program for performing the following steps:
  a first hashing step in which at least a part of said public data is hashed in said communication device to obtain hashed public data,
  a first requesting step in which, said communication device requests the smart card to perform the calculation of the hash function of the key using the key and the hashed public data, wherein the result of the calculation is a hash of the message,
  a second requesting step in which said communication device request the smart card to perform the calculation of the hash function of the key to obtain a hashed key, and
  a second hashing step in which at least a part of said public data is hashed in said communication device using the public data and the hashed key, wherein the result the hash of the message,
  wherein the first hashing step and the first requesting step are performed when the public data proceeds the key in the message, and p2 wherein the second hashing, step and the second requesting step are performed when the public data follows the key in the message.

3. An system comprising:
a smart card; and
a communication device configured to be coupled to said smart card, said communication device and said smart card storing a same hash function for calculating a hash of a message, said message being divided in data blocks and comprising a key and public data, wherein the key is only known by the smart card,
wherein said communication device includes a program for performing the following steps:
  a first hashing step in which at least a part of said public data is hashed in said communication device to obtain hashed public data, and
  a first requesting step in which, said communication device requests the smart card to perform the calculation of the hash function of the key using the key and the hashed public data, wherein the result of the calculation is a hash of the message,
  a second requesting step in which said communication device requests the smart card to perform the calculation of the hash function of the key to obtain a hashed key, and
  a second hashing step in which at least a part of said public data is hashed in said communication device using the public data and the hashed key, wherein the result the hash of the message,
  wherein the first hashing step and the first requesting step are performed when the public data proceeds the key in the message, and
  wherein the second hashing step and the second requesting step are performed when the public data follows the key in the message, and
wherein said smart card includes a program for performing, responsive to the first request from said communication device, calculation of the hash function of the key using the key and the hashed public data and, responsive to the second request from said communication device, calculation of the hash function of the key.

* * * * *